UNITED STATES PATENT OFFICE.

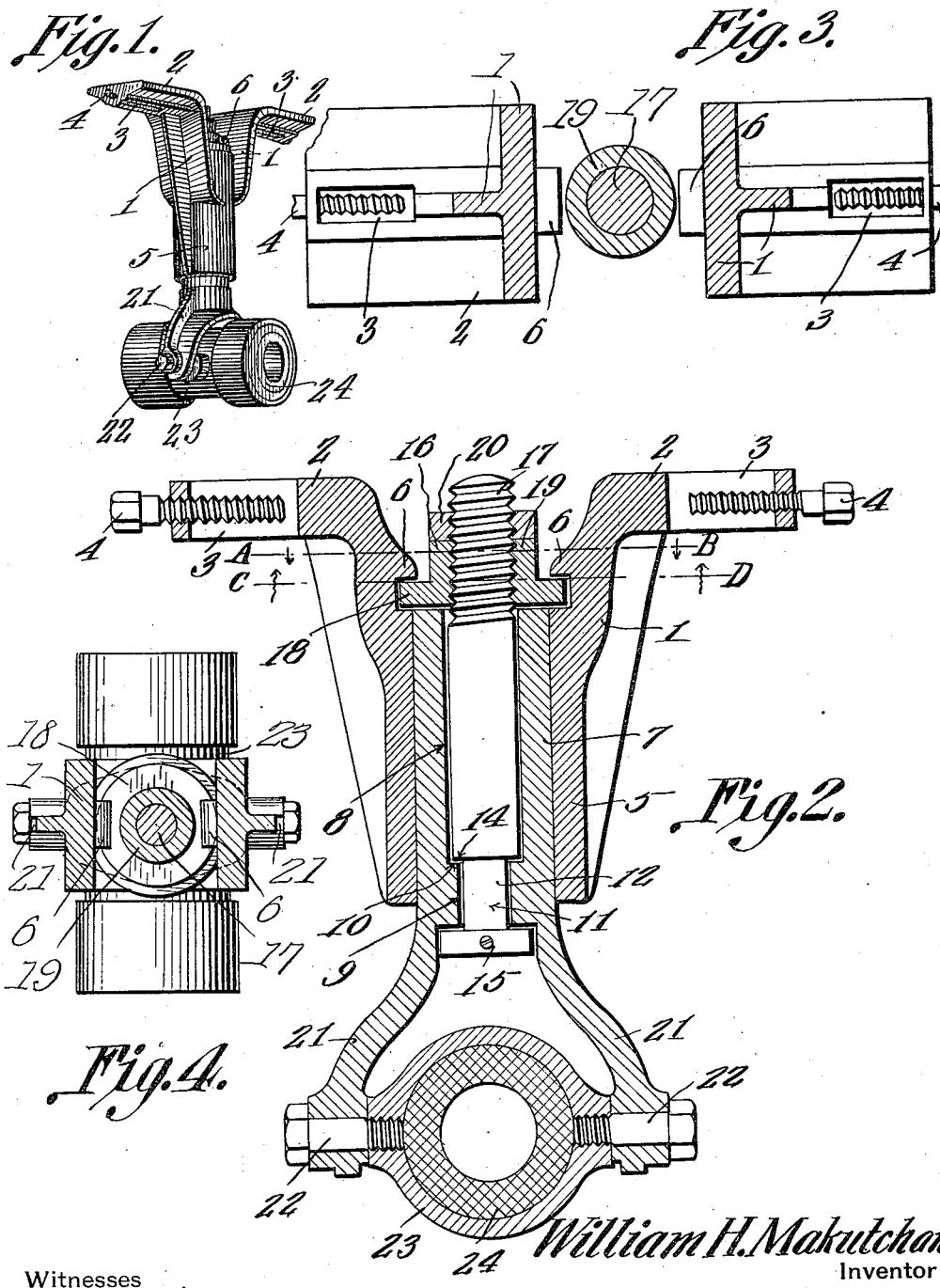

WILLIAM H. MAKUTCHAN, OF CHICAGO, ILLINOIS, ASSIGNOR TO THE MAKUTCHAN ROLLER BEARING COMPANY, OF CHICAGO, ILLINOIS.

HANGER.

1,052,837.  Specification of Letters Patent.  Patented Feb. 11, 1913.

Application filed December 1, 1911. Serial No. 663,281.

*To all whom it may concern:*

Be it known that I, WILLIAM H. MAKUTCHAN, a citizen of the United States, residing at Chicago, in the county of Cook and State of Illinois, have invented a new and useful Hanger, of which the following is a specification.

The device forming the subject-matter of the present invention, is a combined drop hanger and floor stand, and the invention aims to provide a device of this type, in which a bearing may be held for both vertical and horizontal movement, the device comprising a series of parts so assembled that a maximum freedom of movement will result.

A further object of the invention is to provide novel means for assembling a sleeve, carrying a bearing, with a supporting, tubular member.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in perspective; Fig. 2 is a longitudinal section; Fig. 3 is a transverse section upon the line C—D of Fig. 2; and Fig. 4 is a transverse section upon the line A—B of Fig. 2.

In carrying out the invention there is provided a base, including a pair of wings 1, terminating in lateral feet 2, provided with slots 3, there being set screws 4 threaded into the ends of the feet 2, and movable within the slots 3, the construction being such that by adjusting the set screws 4, the device may be moved transversely, the slots 3 being adapted to receive securing elements of any sort, whereby the device is connected with a supporting foundation. The base further includes a tubular support 5, preferably formed integrally with the wings 1. Projecting inwardly from the wings 1, and overhanging the end of the support 5, are spaced lugs 6.

Journaled for rotation in the support 5 is a sleeve 7, the bore 8 of which is reduced adjacent one end, as shown at 9, to form a shoulder 10. Journaled for rotation in the sleeve 7 is a bolt 11, reduced adjacent one end, as to form a neck 12 which is seated within the reduced portion 9 of the bore 8 of the sleeve 7, this reduction in the diameter of the bolt 11 resulting in the formation of a shoulder 14, coöperating with the shoulder 10 of the sleeve 7. Secured to the end of the portion 12 of the bolt 11 is a head 15, engaging one end of the sleeve 7. The head 15 may be secured to the portion 12 of the bolt 11 in any desired manner, the securing of the head 15 being a detail well within the scope of the skill of a mechanic. The opposite end of the bolt 11 is threaded as shown at 17, to receive a nut 16, the same comprising a flange 18, adapted to register beneath the lugs 6, and a head 19. The nut 16 is held in place upon the bolt 11 by means of a lock nut 20. The extremity of the sleeve 7 is provided with diverging arms 21, and into these arms 21 are inserted pivot bolts 22, threaded into a bearing holder 23, carrying a bearing 24 which is fashioned from babbitt or other substance presenting but little friction to iron or steel. The construction is such that the bearing holder 24 may tilt, with the pivot bolts 21 as a center.

In operation, the flange 18 of the nut 16 may be inserted transversely of the support 5 between the lugs 6 upon the one hand, and the end of the support upon the other hand. The bolt 11 may be then inserted into the nut 16 and the sleeve 7 may be mounted in place about the bolt 11, and within the support 5, the head 15 being then secured upon the bolt 11. The portion 19 of the nut 16 is accessible for rotation beyond the lugs 6, thereby permitting a rotation of the nut, and a consequent elevation of the bolt 11 and of the sleeve 7, into position shown in Fig. 2. When the device is inverted from the position shown in Fig. 2, and used as a floor stand, the shoulders 10 and 14 will coöperate, to receive a part of the weight of the shaft which is journaled in the bearing 24, the lug 6 being likewise engaged with the flange 18 of the nut, which will act as a thrust bearing.

Obviously, by manipulating the set screws 4, the entire structure may be given a transverse adjustment.

All of the parts are so proportioned and assembled with each other that, when desired, a free rotation of the bearing holder 23 may be had, with respect to the base 1—2—5.

Having thus described the invention, what is claimed is:—

1. In a device of the class described, a base including lateral wings and a tubular support held between the wings, there being opposed lugs projecting from the wings and overhanging the support; a sleeve located in the support and provided with diverging arms, the bore of the sleeve being reduced to form a shoulder; a bolt located in the sleeve and reduced in diameter at one end to form a neck, rotatable in the reduced portion of the bore of the sleeve, and to form a shoulder coöperating with the shoulder of the sleeve; a head secured to the reduced end of the bolt and engageable by the end of the sleeve between the arms; a nut threaded upon the other end of the bolt, the nut including a flange engaged beneath the lugs, and a body accessible for rotation beyond the lugs; means for holding the nut upon the bolt; a bearing holder pivoted between the arms; and elements adjustable in the base, transversely of the support, for holding the device upon a foundation.

2. In a device of the class described, a base and a tubular support carried by the base, there being opposed lugs projecting from the base and overhanging the support; a sleeve located within the support and provided with diverging arms; a bolt located in the sleeve and having a head at one end, engaging the sleeve between the arms; a nut threaded upon the other end of the bolt and engaging beneath the lugs; and a bearing supported by the arms.

3. In a device of the class described, a base provided with a tubular support, there being lugs upon the base and overhanging one end of the support; a nut transversely insertible between the lugs upon the one hand and said end of the support upon the other hand; a bolt engaged with the nut; a sleeve located between the support and the bolt, the sleeve being engaged with the bolt for rotation and against movement longitudinally of the bolt; and means upon the sleeve for holding a bearing.

In testimony that I claim the foregoing as my own, I have hereto affixed my signature in the presence of two witnesses.

WILLIAM H. MAKUTCHAN.

Witnesses:
M. G. De Grave,
J. E. Shafer.

---

Copies of this patent may be obtained for five cents each, by addressing the "Commissioner of Patents, Washington, D. C."